(12) United States Patent
Park et al.

(10) Patent No.: US 8,564,824 B2
(45) Date of Patent: Oct. 22, 2013

(54) SYSTEM AND PRINTING METHOD TO GENERATE PRINTING DATA OF AN IMAGE TO BE PRINTED OVER A PLURALITY OF RECORDING PAGES

(75) Inventors: Sang-gyu Park, Seoul (KR); Gun-ho Kim, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 652 days.

(21) Appl. No.: 12/267,722

(22) Filed: Nov. 10, 2008

(65) Prior Publication Data
US 2009/0122337 A1    May 14, 2009

(30) Foreign Application Priority Data
Nov. 12, 2007   (KR) .......................... 10-2007-114691

(51) Int. Cl.
*G06K 15/00*    (2006.01)
(52) U.S. Cl.
USPC ........................... 358/1.18; 358/1.9; 358/1.15
(58) Field of Classification Search
None
See application file for complete search history.

(56) References Cited

U.S. PATENT DOCUMENTS

| 5,234,231 | A  | * | 8/1993  | Hollander et al. ................. 281/2 |
| 5,644,411 | A  | * | 7/1997  | Tamagaki et al. ............. 358/529 |
| 5,951,174 | A  | * | 9/1999  | Handa ....................... 400/120.01 |
| 6,222,949 | B1 | * | 4/2001  | Nakata ........................... 382/298 |
| 6,267,518 | B1 | * | 7/2001  | Abe ............................. 400/188 |
| 6,507,411 | B1 | * | 1/2003  | Nishikawa et al. ............ 358/1.2 |
| 6,833,930 | B2 |   | 12/2004 | Nishikawa et al. |
| 6,857,798 | B2 | * | 2/2005  | Matsuyama ..................... 400/76 |
| 7,298,510 | B2 | * | 11/2007 | Natori ........................... 358/1.15 |
| 7,495,803 | B2 | * | 2/2009  | Natori ............................ 358/1.9 |
| 7,551,310 | B2 | * | 6/2009  | Yudasaka et al. ............ 358/1.18 |
| 7,607,108 | B2 | * | 10/2009 | Shiono et al. .................. 715/835 |
| 7,613,413 | B2 | * | 11/2009 | Asada ............................. 399/83 |
| 7,641,951 | B2 | * | 1/2010  | Hodsdon et al. .............. 428/40.1 |
| 7,955,243 | B2 | * | 6/2011  | Hu ................................. 493/343 |
| 8,390,871 | B2 | * | 3/2013  | Morikawa ..................... 358/1.18 |
| 2003/0202211 | A1 | * | 10/2003 | Yudasaka et al. ............ 358/1.18 |
| 2004/0109053 | A1 | * | 6/2004  | Ray ............................... 347/101 |
| 2006/0238807 | A1 | * | 10/2006 | Natori ........................... 358/1.15 |
| 2007/0002379 | A1 | * | 1/2007  | Momose ....................... 358/1.18 |
| 2008/0141885 | A1 | * | 6/2008  | Hu ................................. 101/483 |

FOREIGN PATENT DOCUMENTS

| JP | 2002321422   | 11/2002 |
| JP | 2003216403   | 7/2003  |
| JP | 2006248086   | 9/2006  |
| KR | 1020060084709 | 7/2006 |

OTHER PUBLICATIONS

Korean Office Action Issued on Feb. 28, 2012 in KR Patent Application No. 10-2007-0114691.
Korean Notice of Allowance Issued on May 17, 2012 in KR Patent Application No. 10-2007-0114691.

* cited by examiner

*Primary Examiner* — Dung Tran
(74) *Attorney, Agent, or Firm* — Stanzione & Kim, LLP

(57) ABSTRACT

An image printing method of a host apparatus connected to an image forming apparatus, the method includes selecting an image to be successively printed over a plurality of recording pages, disposing the image to be successively printed on at least one of top, bottom, right and left positions of at least one of the plurality of recording pages, generating printing data of the image to be successively printed over the plurality of recording pages, and transmitting the printing data to the image forming apparatus.

21 Claims, 10 Drawing Sheets

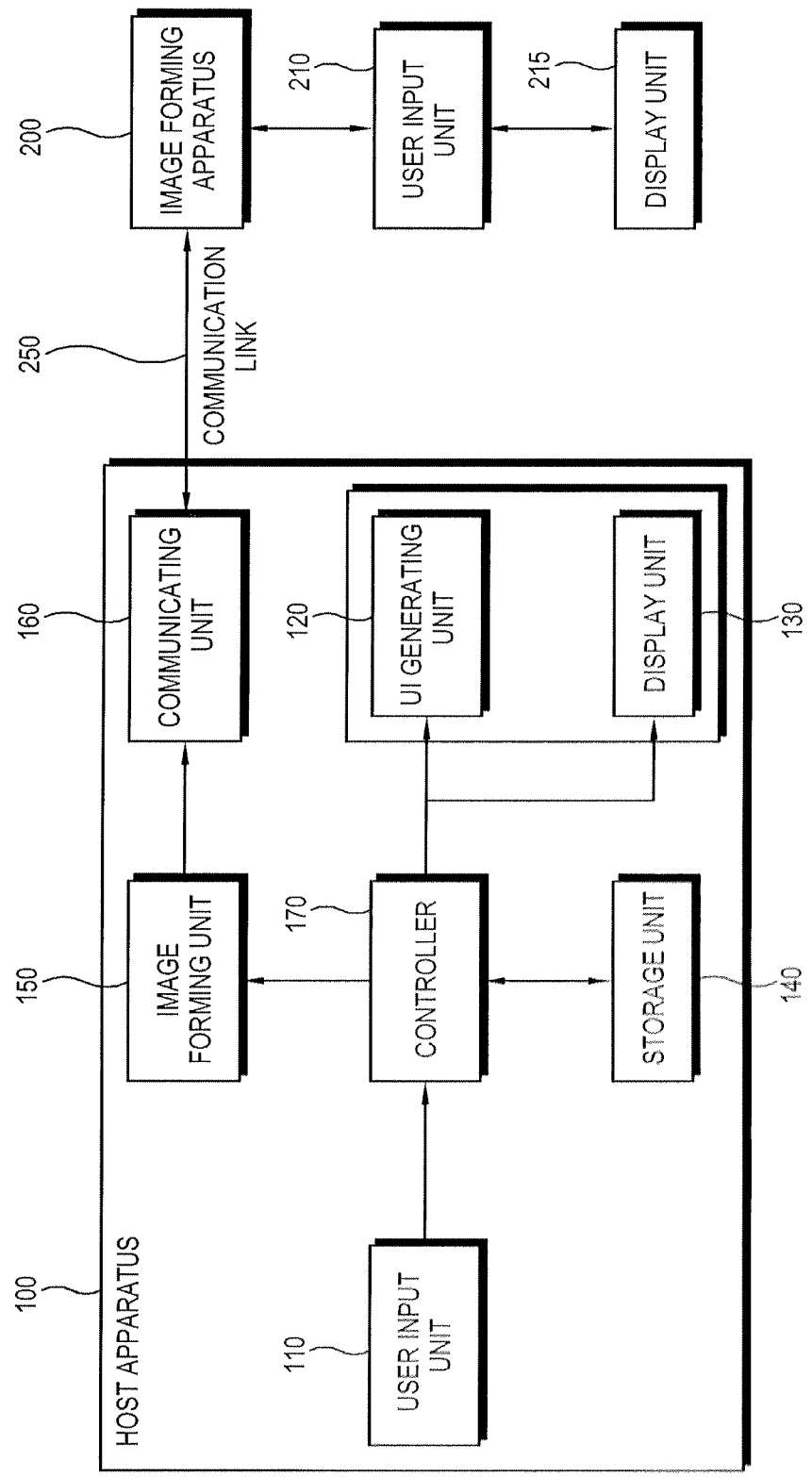

SYSTEM AND PRINTING METHOD TO GENERATE PRINTING DATA OF AN IMAGE TO BE PRINTED OVER A PLURALITY OF RECORDING PAGES

CROSS-REFERENCE TO RELATED APPLICATIONS

This application claims priority under 35 U.S.C. §119(a) from Korean Patent Application No. 10-2007-0114691, filed on Nov. 12, 2007 in the Korean Intellectual Property Office, the disclosure of which is incorporated herein by reference in its entirety.

BACKGROUND OF THE INVENTION

1. Field of the Invention

The present general inventive concept relates to a host apparatus for an image forming apparatus and a successive image printing method thereof, and more particularly to a host apparatus and an image processing method thereof in which an image is printed on a plurality of recording pages of a printing medium.

2. Description of the Related Art

A host apparatus transmits printing data to an image forming apparatus, such as a printer, so that the printing data can be printed on a recording page of a printing medium, for example, printing paper, or the like. The host apparatus may include a computer system, or the like.

The host apparatus may process the printing data in such a manner that one image can be printed over a plurality of recording pages as well as on a single recording page. A process of printing the one image over a plurality of recording pages is called poster printing.

As an example of the poster printing, an image such as a letter 'A' may be printed over the plurality of recording pages as shown in FIG. 1A. In this example, as illustrated in FIG. 1B, a conventional host apparatus centrally disposes the letter 'A' over the plurality of recording pages, which are adjacently arranged and adapted to receive the printed letter 'A,' and divides the letter 'A' along the edges of the plural recording pages. Then, the printing data is processed to successively form the letter 'A' on the plural recording pages, and each of the plurality of recording pages having a margin 1 and a print area 2. Then, the entire letter 'A' is printed over the print areas 2 of the plural recording pages but is not printed on the margin 1 at the edges where the plurality of recording pages are adjacent to each other.

Referring to FIG. 1B, the presence of the margins 1 at the edges of the plurality of recording pages make it difficult to clearly observe the printed image. Accordingly, there has been proposed a technology for enhancing the quality of the printed image. For example, referring to FIG. 1C, there is a method such that the margins at the edges where the recording pages are adjacent to each other are eliminated by being set to be equal to '0.'

However, in the conventional poster printing, it is difficult for a user to set an image to be printed at a desired position because the image is fixedly disposed with respect to a certain position of the plural recording pages arranged and adapted to receive the printed image, particularly, on a center over the plural recording pages.

Further, it is difficult for a user to manually set attributes of a printed image, such as the size, the color, etc. of the printing image, as well as the position.

SUMMARY OF THE INVENTION

The present general inventive concept provides a host apparatus, which is convenient for a user to easily set a position of an image to be successively formed over a plurality of recording pages, and an image processing method thereof.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept can be achieved by providing an image printing method of a host apparatus connected to an image forming apparatus, the method including selecting an image to be successively printed over a plurality of recording pages, disposing the image to be successively printed on at least one of top, bottom, right and left positions of each of the plurality of recording pages, generating printing data of the image to be successively printed over the plurality of recording pages, and transmitting the printing data to the image forming apparatus.

The method may further include printing the printing data.

Each of the plurality of recording pages may be arranged to be adjacent to at least one of top, bottom, right and left positions of at least another recording page of the plurality of recording pages.

At least one of the plurality of recording pages may include both sides of a single recording page.

The disposing of the image may include adjusting at least one margin of each of the plurality of recording pages where the image is disposed.

The disposing of the image may include editing the image.

The disposing of the image may include disposing a portion of the image on a first recording page of the plurality of recording pages and at least another portion of the image on at least another of the plurality of recording pages disposed adjacent to the first recording page.

The image may include text.

The printing data may be previewable on a display unit.

A preview of the printing data may be provided on a display unit of the image forming apparatus or on a user interface (UI) display of the host apparatus.

The plurality of recording pages may be fed from different storage trays of the image forming apparatus.

The foregoing and/or other aspects and utilities of the present general inventive concept can also be achieved by providing an host apparatus connected to an image forming apparatus including a user input unit to allow a user to select an image to be printed over a plurality of recording pages, a communicating unit to communicate with the image forming apparatus, and a controller to dispose an image on at least one of top, bottom, right and left positions of each of the plurality of recording pages according to at least one selection from the user input unit, to generate printing data of the image to be successively printed over the plurality of recording pages, and to transmit the printing data to the image forming apparatus.

The operation of the controller, such as the generating of the printing data corresponding to the selected and disposed image, may be implemented in a printer driver.

Each of the plurality of recording pages may be arranged to be adjacent to at least one of top, bottom, right and left positions of at least another of the plurality of recording pages.

The controller may adjust a margin of each of the plurality of recording pages where the image is disposed.

The controller may edit the image.

A portion of the image may be printed on a first recording page of the plurality of recording pages and at least another portion of the image may be printed on at least another of the plurality of recording pages disposed adjacent to the first recording page.

The host apparatus may further include a display unit, wherein the controller controls the display unit to preview the printing data.

The foregoing and/or other aspects and utilities of the present general inventive concept can also be achieved by providing a method of controlling an image forming printing system, the method including displaying an image to be successively printed over a plurality of edges of at least one recording page, selecting edit information to edit the displayed image, processing image information which includes the selected edit information of the image, and printing the processed image information over the plurality of edges of the at least one recording page.

The processed image may be printed over a front side and a back side of a single recording page.

The processed image may be printed over a plurality of adjacent recording pages.

The selecting of the edit information to edit the displayed image may include manually selecting a position of the image to be successively printed over a plurality of edges of at least one recording page.

The foregoing and/or other aspects and utilities of the present general inventive concept can also be achieved by providing a computer readable recording medium having encoded thereon computer instructions that when executed by a computer perform a method of successively printing an image using a host apparatus connected to an image forming apparatus, the method including selecting an image to be successively printed over a plurality of recording pages, disposing the image to be successively printed on at least one of top, bottom, right and left positions of each of the plurality of recording pages, generating printing data of the image to be successively printed over the plurality of recording pages, and transmitting the printing data to the image forming apparatus.

BRIEF DESCRIPTION OF THE DRAWINGS

These and/or other aspects and utilities of the present general inventive concept will become apparent and more readily appreciated from the following description of the exemplary embodiments, taken in conjunction with the accompanying drawings, of which:

FIG. 2 is a block diagram of a host apparatus according to an exemplary embodiment of the present general inventive concept;

DETAILED DESCRIPTION OF THE PREFERRED EMBODIMENTS

Figure 1A:
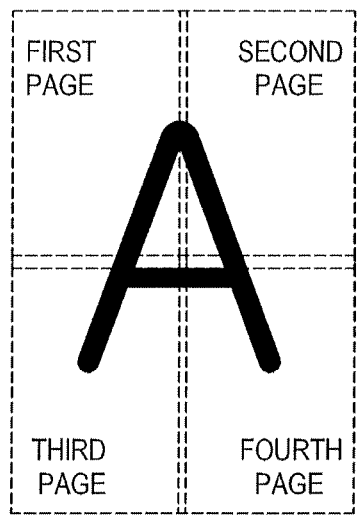
FIGS. 1A through 1C illustrate an example of poster printing according to a conventional image printing method.
Figure 1B:
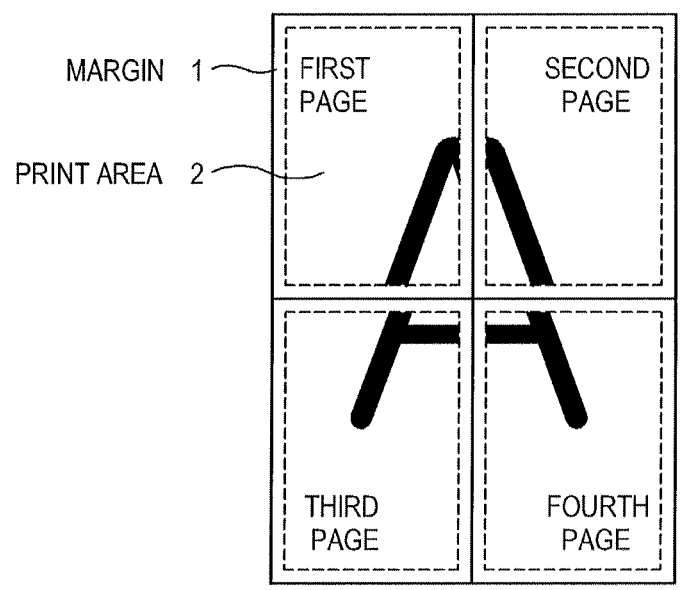
Figure 1C:
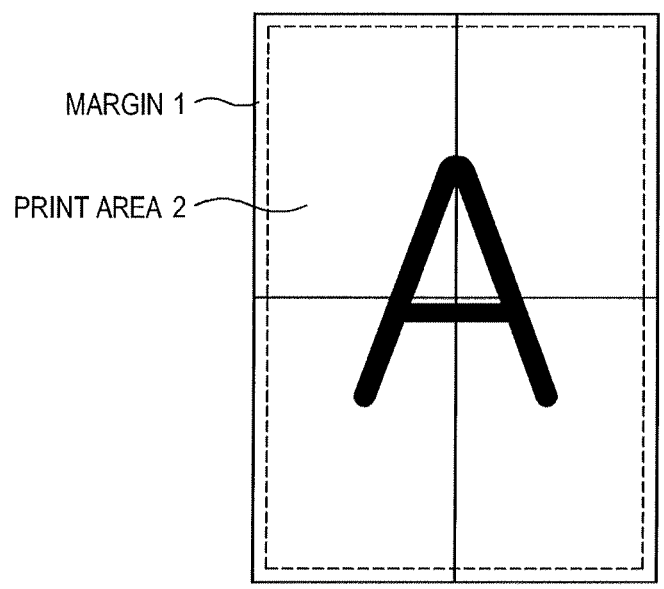

Reference will now be made in detail to the embodiments of the present general inventive concept, examples of which are illustrated in the accompanying drawings, wherein like reference numerals refer to like elements throughout. The embodiments are described below so as to explain the present general inventive concept by referring to the figures.

FIG. 2 is a block diagram of a host apparatus 100 and an image forming apparatus 200 according to an exemplary embodiment of the present general inventive concept. The host apparatus 100 according to an exemplary embodiment of the present general inventive concept may be realized as a computer system or the like, and can communicate data over a wired, or wireless, communication link 250 with the image forming apparatus 200, which may be, for example, a printer, a multi-function peripheral device, etc.

In a case where a plurality of recording pages, such as, for example, printing paper, are arranged and are adjacent to each other, the host apparatus 100 processes printing data to form a printing image over the plural recording pages at a setting position disposed across adjacent edges of the plural recording pages. The printing image may contain not only a sealing image to certify the image but also a logotype, a signature, a text legend of "This is strictly confidential," etc.

As illustrated in FIG. 2, the host apparatus 100 includes a user input unit 110, a user interface (UI) generating unit 120, a display unit 130, a storage unit 140, an image forming unit 150, a communicating unit 160, and a controller 170.

The user input unit 110, which may be a mouse, a keyboard, or the like (not illustrated), of the host apparatus 100, allows a user to select an image displayed on the display unit 130 to be printed on the plurality of adjacent recording pages and to set the position of the selected image. The display unit 130 may be, for example, a liquid crystal display (LCD), or a touch screen display, and may be a separate device from the user input unit 110 or may be formed as part of the user input unit 110. Specifically, through the user input unit 110 a user may input instructions about which image he/she wants to print, how many recording pages are to be used to print the image, and where the image is to be disposed on the recording pages (e.g., the top, the bottom, the right and the left of paper), thereby prompting the controller 170 to process the printing data to be successively formed on the edges of the recording pages according to margin setting (to be described below). A key button, or the like, provided on the host apparatus 100 may be used to manipulate the image up, down, left and right to set the desired position of the image.

The UI generating unit 120 generates a UI display on the display unit 130 to perform an edit function which may include displaying a menu having edit selections to receive a user's input selection on the UI to set the position of the image. Further, the UI display may include edit selections for the user to select to change the size, the fount, the color, etc. of the image as well as the position of the image. In this embodiment, the edit function allows a user to manually position the original image to be set at a desired position over a plurality of recording pages and may allow a user to expand and/or contract the image size in a vertical and/or horizontal direction over the plurality of recording pages.

In this embodiment, the display unit 130 displays the edges of the plural recording pages within which the image is positioned, the image to be printed on the plural recording pages, the UI edit menu to receive a user' edit selection input regarding the image, and so on. Further, according to a user's edit instructions input through the display unit 130, the display unit 130 displays a movement of the position of the image or a change in attributes, such as the size, the fount, the color, etc. of the image. The display unit 130 may also display a sealing image to be selected by a user in a sealing mode.

The UI generating unit 120 and the display unit 130 serve as the user interface (UI) of the host apparatus 100. The user interface (UI) of the host apparatus 100 may provide a preview on the display unit 130 for a user to preview the printing data to be successively printed all over the plural recording pages.

The storage unit 140 stores the printing data about an image. The storage unit 140 may be realized as a hard disk drive (HDD), a random access memory (RAM), a removable memory stick, or other data storage device.

Further, the storage unit 140 may store information about image setting of the printing data. For example, the storage unit 140 may store default information about at least one image, and stores changed information if information of an image selected by a user is changed such as the position, the size, the font, etc. The changed information may be stored along with the printing data in a section of the storage unit 140, or it may be stored separately from the printing data in another section of the storage unit 140 and managed as information linked to the printing data.

The image forming unit 150 forms an image based on the printing data including the position of the image which is set by a user's selection.

The communicating unit 160 transmits the printing data to the image forming apparatus 200, where the printing data includes data of an image to be printed over edges of recording pages. The image forming apparatus 200 performs printing according to the received printing data.

The controller 170 performs general control of the host apparatus 100. Specifically, the controller 170 processes the printing data to be successively formed as an image at a setting position selected by a user across adjacent edges over a plurality of recording pages. In other words, the controller 170 generates and processes the printing data corresponding to the image selected and disposed over the plurality of recording pages through the user input unit 110, and such an operation of the controller 170 may be implemented in a printer driver.

FIGS. 3A through 3E illustrate an example of setting an image printing position with respect to an edge of a recording page.

Figure 3A:
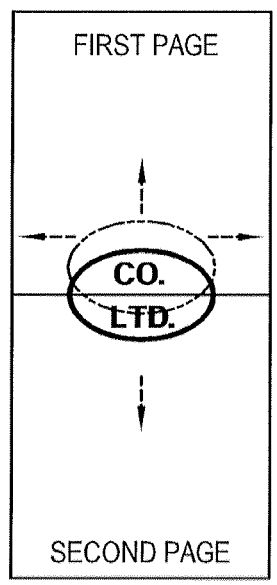
FIGS. 3A through 3E illustrate an example of setting an image printing position with respect to an edge of a recording page according to an exemplary embodiment of the present general inventive concept.
Figure 3B:
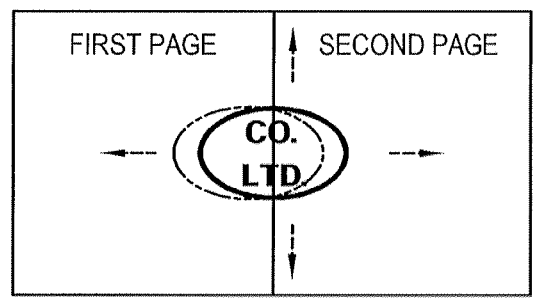

As illustrated in FIG. 3A, if an image is set by a user to be successively formed over edges of two vertically adjacent recording pages, the controller 170 eliminates margins at a bottom edge of a first page and a top edge of a second page by, for example, setting a value of the margins to be equal to '0.' Likewise, as illustrated in FIG. 3B, if the image is set by user to be successively formed over two horizontally adjacent recording pages, the controller 170 eliminates margins at a right edge of a first page and a left edge of a second page by, for example, setting a value of the margins to be equal to '0.'

Figure 3C:
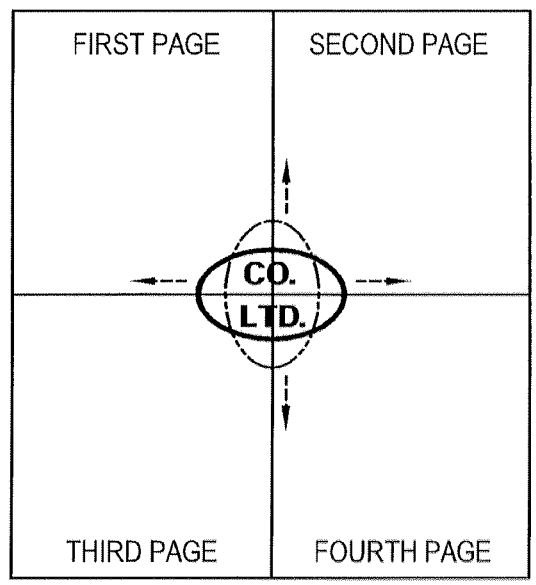
Figure 3D:
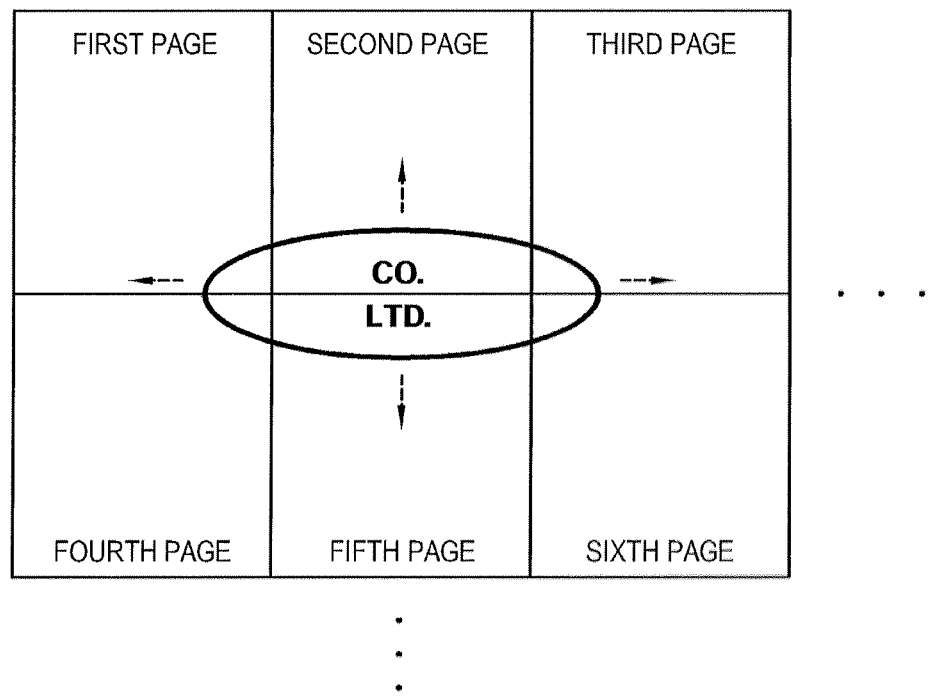

Further, as illustrated in FIG. 3C, if the image is set by a user to be successively formed over four recording pages at a central position where the four recording pages are immediately adjacent to each other, the controller 170 eliminates margins at bottom and right edges of a first page, bottom and left edges of a second page, top and right edges of a third page, and top and left edge of a fourth page by, for example, setting a value of the margins to be equal to '0.' Likewise, as illustrated in FIG. 3D, if the image is set by a user to be successively formed over six or more recording pages, the controller 170 eliminates the corresponding margins by, for example, setting a value of the margins of the six recording pages which include a portion of the image to be equal to '0.'

Thus, a portion of an image is printed on a first recording page, and at least another portion of the image is printed on at least another recording page adjacent to the first recording page.

Figure 3E:
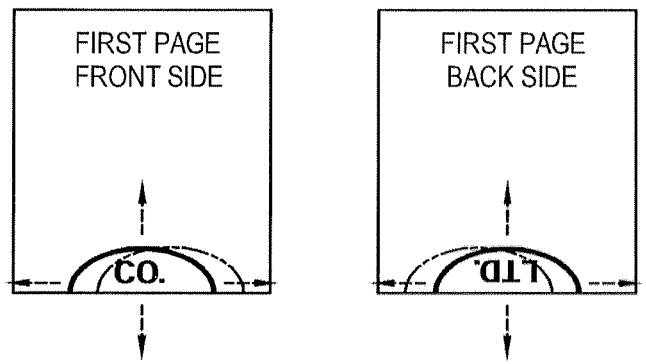

Referring to FIG. 3E, the host apparatus 100 according to an exemplary embodiment of the present general inventive concept may process an image to be printed over both sides of a single printing medium, such as a single recording page. In other words, a user may select an image to be successively positioned and to be printed over edges of a front and back side of a single recording page.

In this case, the controller 170 eliminates margins at bottom edges of the front and back sides by, for example, setting a value of the margins to be equal to '0,' and then processes the printing data to print an image over the edges of the front and back sides of the single recording page without the margins. The portion of the image formed on the back side may be a mirror image of the portion of the image formed on the front side.

The controller 170 processes the printing data so as to print an image at a position on at least one recording page that is set by a user through the user input unit 110.

If the host apparatus 100 supports various sizes of recording pages to be fed for successive printing of an image over a plurality of recording pages, the controller 170 may process an image to be successively printed at a setting position even though adjacent papers may be different in size or color from each other.

In an embodiment, the image forming apparatus 200 receives the printing data from the host apparatus 100 and prints the printing data with a predetermined image (for example, a sealing image). Specifically, the image forming apparatus 200 may receive printing data of an image which is disposed over a plurality of the recording pages and may process the image to be successively formed at a user selected setting position across adjacent edges over the plurality of recording pages, by eliminating margins on edges of each of the plurality of recording pages to receive at least a portion of the image, by, for example, setting the corresponding margins to be equal to '0'.

The image forming apparatus 200 may include a function key (not illustrated) disposed on a user input unit 210 corresponding to a sealing mode to be used by a user to select an image displayed on a display unit 215 which may be, for example, a liquid crystal display (LCD), or a touch screen display, and may be disposed on the image forming apparatus 200 as a separate device from the user input unit 210, or may be formed as part of the user input unit 210 of the image forming apparatus 200. The image forming apparatus 200 may include an arrow key (not illustrated) disposed on the user input unit 210 to be used by the user to set (and/or to manipulate and dispose) the position of the image over at least one of a plurality of recording pages.

If the image forming apparatus 200 supports various sizes of recording pages, the image forming apparatus 200 may successively print an image according to a user selected set position of the image to be printed over a plurality of different-sized recording pages which may be fed from different storage trays.

Figure 4:
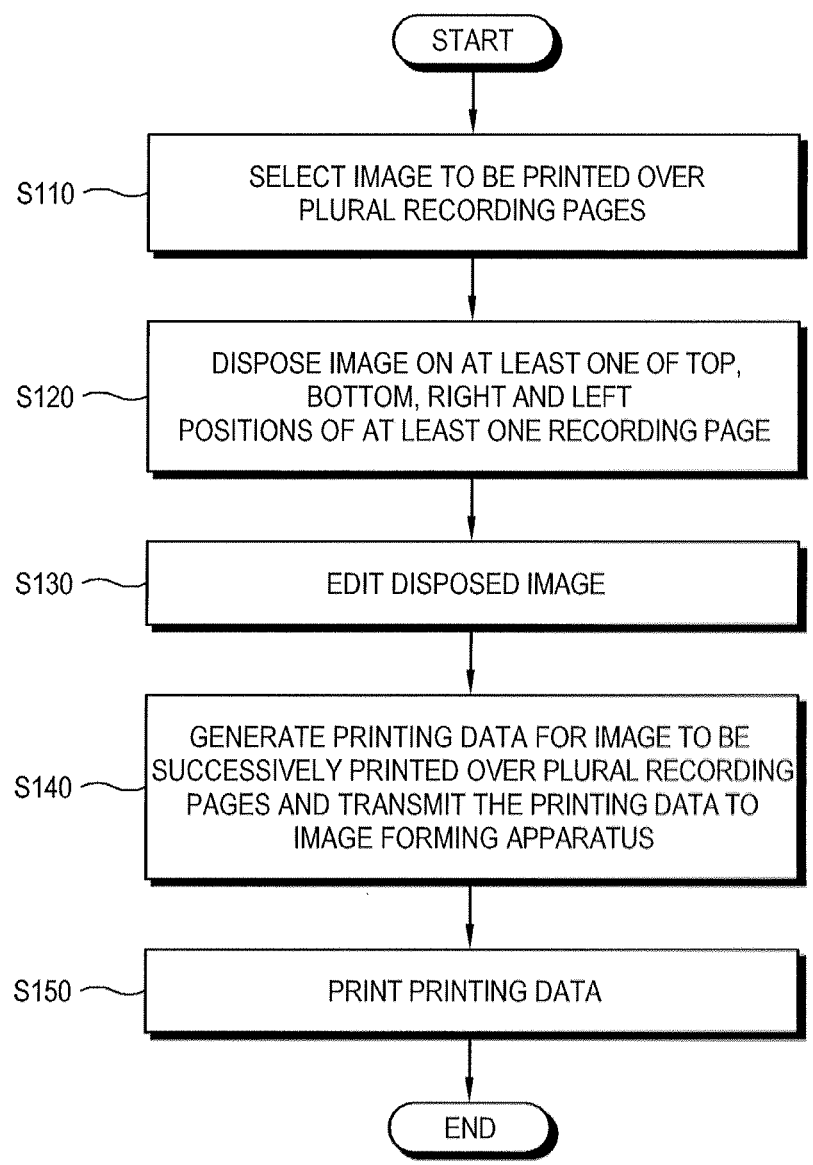
FIG. 4 is a flowchart of an image printing method according to an exemplary embodiment of the present general inventive concept.

In the host apparatus 100 connected to the image forming apparatus 200, an image printing method thereof will be described below with reference to FIG. 4.

At operation S110, the host apparatus 100 may select an image to be printed over a plurality of recording pages according to a user's selection through the user input unit 110 where the plural recording pages are arranged and are adjacent to each other. The image may contain not only a sealing image but also a logotype, a signature, a text of "This is strictly confidential," or other image.

The controller 170 may dispose the selected image on at least one of the plurality of recording pages on at least one of the top, bottom, right and left of the at least one of the plurality of recording pages, at operation S120. The image may be positioned in such a manner that a portion of the image is to be printed on a first recording page and at least another portion of the image is to be printed on at least another of the plurality of recording pages which is adjacent to the first recording page. In other words, one recording page is arranged to be adjacent to at least one of the top, the bottom, the right and the left of at least another recording page of the plurality of recording pages.

At operation S130, the controller 170 may edit the image disposed according to edit function which includes a user's edit instruction. The edit function includes manually disposing an original image at a desired position, expanding or contracting the image size in a vertical and/or horizontal direction, and changing setting information corresponding to the size, the font, the color, etc. of the image. While manipulating the image according to a user's instruction, the controller 170 may control the display part 115 to display to a user the plurality of the recording pages, including edges of the plurality of the recording pages, the position of the image over the edges and the plurality of the recording pages, and/or a change in the selected image according to edit information input by the user to change and/or set the image.

The UI generating unit 120 may generate a UI to receive information from a user about the size, the font, the color, etc. of the image, so that the generated UI can be displayed on the display part 115 through the display unit 130. The controller 170 may control the storage unit 140 to store image setting information such as the position, the size, the font, the color, etc. of the image.

At operation S140, the controller 170 processes the printing data of an image to be successively printed over the plurality of recording pages and transmits the processed printing data to the image forming apparatus 200.

The controller 170 may process the printing data so that the image can be printed at a position set by the user in operation S110. Specifically, the controller 170 may adjust margins of the recording pages, where the image is disposed. For example, the controller 170 may eliminate the margin at one or more edge of each of the plural recording pages by, for example, setting a value of the respective margin to be equal to '0.' If the image is set to be successively formed over two vertically adjacent recording pages, the controller 170 may eliminate the margins at the bottom edge of a first page and at a top edge of a second page by, for example, setting a value of the respective margin to be equal to '0.'

Further at the operation S140, the controller 170 may process the printing data of an image to be successively printed over both sides of a single recording page. For example, the controller 170 may eliminate margins at respective bottom edges of a front and back sides of the single recording page by, for example, setting a value of the respective margin to be equal to '0,' and then processes the printing data to be printed as an image without the margins. In this example, the image formed on the back side may be a mirror image of the image formed on the front side of the single recording page.

Also, the controller 170 may provide a user with a user interface (UI) to allow the user to preview and edit the printing data. The edit and preview operation may be achieved by the display part 115 of the image forming apparatus 200 as well as the user interface (UI) of the host apparatus 100.

At operation S150, the image forming apparatus 200 outputs the printing data received from the host apparatus 100.

As described above, the present general inventive concept provides a host apparatus, which is convenient for a user to easily set a position of an image to be successively formed over a plurality of recording pages, and an image printing method thereof.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few exemplary embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An image printing method of a host apparatus connected to an image forming apparatus, the method comprising:
   selecting a sealing image to be successively printed over a plurality of recording pages;
   disposing the sealing image to be successively printed at a desired position on at least one of top, bottom, right and left positions of each of the plurality of recording pages by manipulating the sealing image up, down, left and right to set the desired position of the sealing image;
   processing a printing data and generating a printing image to form the sealing image to be successively printed over the plurality of recording pages, the sealing image certifying a master image of the printing data, and the printing image comprising the master image and the sealing image; and
   transmitting the printing image to the image forming apparatus,
   wherein the sealing image comprises at least one of a predetermined image, a logotype, a signature, and a predetermined text, and
   wherein each of the plurality of recording pages is arranged to be adjacent to at least one of top, bottom, right and left positions of at least another recording page of the plurality of recording pages.

2. The method according to claim 1, further comprising: printing the printing data.

3. The method according to claim 1, wherein at least one of the plurality of recording pages comprises both sides of a single recording page.

4. The method according to claim 1, wherein the disposing of the sealing image comprises:
   adjusting at least one margin of each of the plurality of recording pages where the sealing image is disposed.

5. The method according to claim 1, wherein the disposing of the sealing image comprises:
   editing the sealing image.

6. The method according to claim 1, wherein the disposing of the sealing image comprises:

disposing a portion of the sealing image on a first recording page of the plurality of recording pages and at least another portion of the sealing image on at least another of the plurality of recording pages disposed adjacent to the first recording page.

7. The method according to claim 1, wherein the printing data is previewable on a display unit.

8. The method according to claim 7, wherein a preview of the printing data is provided on a display unit of the image forming apparatus or on a user interface (UI) display of the host apparatus.

9. The method according to claim 1, wherein the plurality of recording pages is fed from different storage trays of the image forming apparatus.

10. The method according to claim 1, wherein the sealing image is positioned and printed over edges of a front and back side of a single recording page.

11. The method according to claim 10, wherein a sealing image to be printed on the back side is a mirror image of a sealing image to be printed on the front side.

12. A host apparatus connected to an image forming apparatus, comprising:
  a user input unit to allow a user to select a sealing image to be printed over a plurality of recording pages;
  a communicating unit to communicate with the image forming apparatus; and
  a controller to dispose the sealing image at a desired position on at least one of top, bottom, right and left positions of each of the plurality of recording pages according to at least one selection by manipulating the image up, down, left and right to set the desired position of the sealing image from the user input unit, to process a printing data and generate a printing image to form the sealing image to be successively printed over the plurality of recording pages, the sealing image certifying a master image of the printing data, and the printing image comprising the master image and the sealing image, and to transmit the printing image to the image forming apparatus,
  wherein the sealing image comprises at least one of a predetermined image, a logotype, a signature, and a predetermined text to certify the print data, and
  wherein each of the plurality of recording pages is arranged to be adjacent to at least one of top, bottom, right and left positions of at least another of the plurality of recording pages.

13. The host apparatus according to claim 12, wherein an operation of the controller, of generating the printing data corresponding to the selected and disposed sealing image, is implemented in a printer driver.

14. The host apparatus according to claim 12, wherein the controller adjusts a margin of each of the plurality of recording pages where the sealing image is disposed.

15. The host apparatus according to claim 12, wherein the controller edits the sealing image.

16. The host apparatus according to claim 12, wherein a portion of the sealing image is printed on a first recording page of the plurality of recording pages and at least another portion of the sealing image are printed on at least another of the plurality of recording pages disposed adjacent to the first recording page.

17. The host apparatus according to claim 12, further comprising:
  a display unit, wherein the controller controls the display unit to preview the printing data.

18. The host apparatus according to claim 12, wherein the sealing image is positioned and printed over edges of a front and back side of a single recording page.

19. The host apparatus according to claim 18, wherein a sealing image to be printed on the back side is a mirror image of a sealing image to be printed on the front side.

20. A method of controlling an image forming printing system, the method comprising:
  displaying a sealing image to be successively printed over a plurality of edges of at least one recording page;
  selecting edit information to edit the displayed sealing image;
  setting position information, separate from edit information, such that the sealing image is successively printed at a desired position over a plurality of edges of at least one recording page;
  processing a printing data with image information which includes the selected edit and position information of the sealing image and generating a printing image, the sealing image certifying a master image of the printing data, and the printing image comprising the master image and the sealing image; and
  printing the generated image, the sealing image being printed over the plurality of edges of the at least one recording page,
  wherein selecting edit information comprises at least one of expanding and contracting the sealing image size in at least one of a vertical and a horizontal direction,
  wherein the sealing image comprises at least one of a predetermined image, a logotype, a signature, and a predetermined text to certify the print data.

21. The method according to claim 20, wherein the selecting of edit information to edit the displayed sealing image comprises:
  manually selecting a position of the sealing image to be successively printed over a plurality of edges of at least one recording page.

* * * * *